United States Patent
Armstrong et al.

(10) Patent No.: US 6,942,717 B2
(45) Date of Patent: Sep. 13, 2005

(54) VENTURI EFFECT MATERIAL RETURN SYSTEM OF A MATERIAL COLLECTION SYSTEM AND APPERTAINING METHOD

(75) Inventors: Thomas W. Armstrong, Orange Park, FL (US); Scott Johnson, Ponte Vedra, FL (US)

(73) Assignee: Vac-Con, Inc., Green Cove Springs, FL (US)

( * ) Notice: Subject to any disclaimer, the term of this patent is extended or adjusted under 35 U.S.C. 154(b) by 101 days.

(21) Appl. No.: 10/431,109

(22) Filed: May 7, 2003

(65) Prior Publication Data

US 2004/0221717 A1 Nov. 11, 2004

(51) Int. Cl.[7] .............................................. B01D 35/16
(52) U.S. Cl. ........................... 95/26; 55/302; 55/304; 55/431; 55/432
(58) Field of Search .................... 55/430–433, 302–305, 55/408; 95/24, 26

(56) References Cited

U.S. PATENT DOCUMENTS

| | | | | |
|---|---|---|---|---|
| 3,614,857 A | * | 10/1971 | Fette | 96/411 |
| 3,813,853 A | * | 6/1974 | Anderson | 95/279 |
| 4,000,995 A | * | 1/1977 | Morris | 55/282 |
| 4,017,281 A | | 4/1977 | Johnstone | 55/334 |
| 4,227,893 A | * | 10/1980 | Shaddock | 95/268 |
| 4,289,512 A | * | 9/1981 | Levresse | 55/315 |
| 4,411,674 A | * | 10/1983 | Forgac | 55/304 |
| 4,465,497 A | * | 8/1984 | Howeth | 96/427 |
| 4,469,490 A | * | 9/1984 | Wilson | 95/269 |
| 4,578,840 A | * | 4/1986 | Pausch | 15/352 |
| 4,747,852 A | * | 5/1988 | Engstrom | 95/271 |
| 4,909,814 A | * | 3/1990 | Sisk | 55/304 |
| 5,053,063 A | * | 10/1991 | Sisk | 55/304 |
| 5,129,922 A | * | 7/1992 | Kaiser | 95/279 |

* cited by examiner

Primary Examiner—Richard L. Chiesa
(74) Attorney, Agent, or Firm—Schiff Hardin LLP

(57) ABSTRACT

A material return system of a material collection system and appertaining method permits fine material collected in a fine material collector to be returned to a main debris tank by taking advantage of the venturi effect, thus permitting a relatively trouble-free operation of the material collection system.

26 Claims, 2 Drawing Sheets

VENTURI EFFECT MATERIAL RETURN SYSTEM OF A MATERIAL COLLECTION SYSTEM AND APPERTAINING METHOD

BACKGROUND OF THE INVENTION

1. Field of the Invention

The invention relates to a material return system of a material collection system that uses the venturi effect to flush fine material back into a collection vessel.

2. Description of the Related Art

Various systems have been designed to collect bulk materials into a storage receptacle using a vacuum. Most bulk materials comprise a wide range of particle sizes from large/coarse to fine. One of the known problems is that when collecting material having this wide range of particle sizes, it is difficult to contain the fine material because of its tendency to be disturbed and blown around by the forces on the air exerted by the vacuum. These fine materials can, over time, collect in undesirable locations and prevent proper operation of the system The traditional way of returning the fine materials or carry over from the process of vacuuming dense bulk materials into a vacuum collection vessel or debris tank is to use mechanical devices such as augers, conveyers or other mechanisms to hold the fine material in a collection chamber, bag house or dump tubes that have to be mechanically empted/dumped when the debris tank is full. Vacuum sealing of augers, conveyers and dump tubes are high maintenance items. Since the tubes can only be dumped after the material is transported to a dump site, the material settles and packs during transport and requires vibrators or manual cleaning to clean out the tubes or bag houses. In order to prevent an accumulation of this fine material that would preclude operation of the system, frequent inefficient stops may be needed to empty the fine material.

U.S. Pat. No. 4,227,893 discloses an auger used for mechanically returning fine materials to the bulk collection portion of the debris tank, however the auger represents a mechanical apparatus that increases the system complexity and introduces costs to the system.

U.S. Pat. No. 4,017,281 discloses a material collection system in which the fine material is collected from a dust collecting chamber by a pipe connected to a door/port and relies exclusively on a pressure differential between the dust collection chamber and the hopper to remove the fine material. Since the pressure differential is of concern for performing an effective job, this differential must be maximized in order to maximize the cleanout of the dust collecting chamber. This results in a nonoptimized solution.

SUMMARY OF THE INVENTION

The object of the present invention is to provide a more effective and simpler to operate system and method for collecting and returning fine material back into a main debris tank based on the venturi effect. This system may be used in a pneumatic/vacuum conveying device that may be skid mounted, on mobile truck mounted trailer mount or in plant system using a collection vessel, and comprises a separator or bag house that returns the fine materials or liquids to the collection vessel while continuing to convey bulk materials into the collection vessel. The system is designed to automatically return fine materials or liquids separated and/or filtered from the air that is pneumatically conveying dense materials into a collection vessel, vacuum box, debris collection tank or container.

The object of the invention is achieved by providing a valve under the bag house or separator having a small fine material collection vessel that is located under the valve in which fine materials or liquids can be collected. When the fine material collection vessel is full, a bag house valve is closed. A venturi tube is present which is mounted under the fine material collection vessel and connected to the top of the debris tank. When the venturi valve is momentarily opened to atmosphere, the vacuum in the debris tank and atmospheric air rush through the venturi tube and induct the fine materials into the air stream and back into the debris tank. The venturi valve is then closed and the bag house valve is opened allowing the process to be repeated as often as necessary during the operation of the vacuum conveying device. The process of returning the fine materials or liquids to the debris tank happens so quickly that the bulk material being pneumatically conveyed into the debris tank are not affected, and there is no loss of production while cleaning the bag house or separator. All material from the fine material collection vessel is transported in the debris tank. The above procedure may be made automatic by the addition of a programmable control, sequence valves and/or timers.

DETAILED DESCRIPTION OF THE PREFERRED EMBODIMENTS

Figure 1:
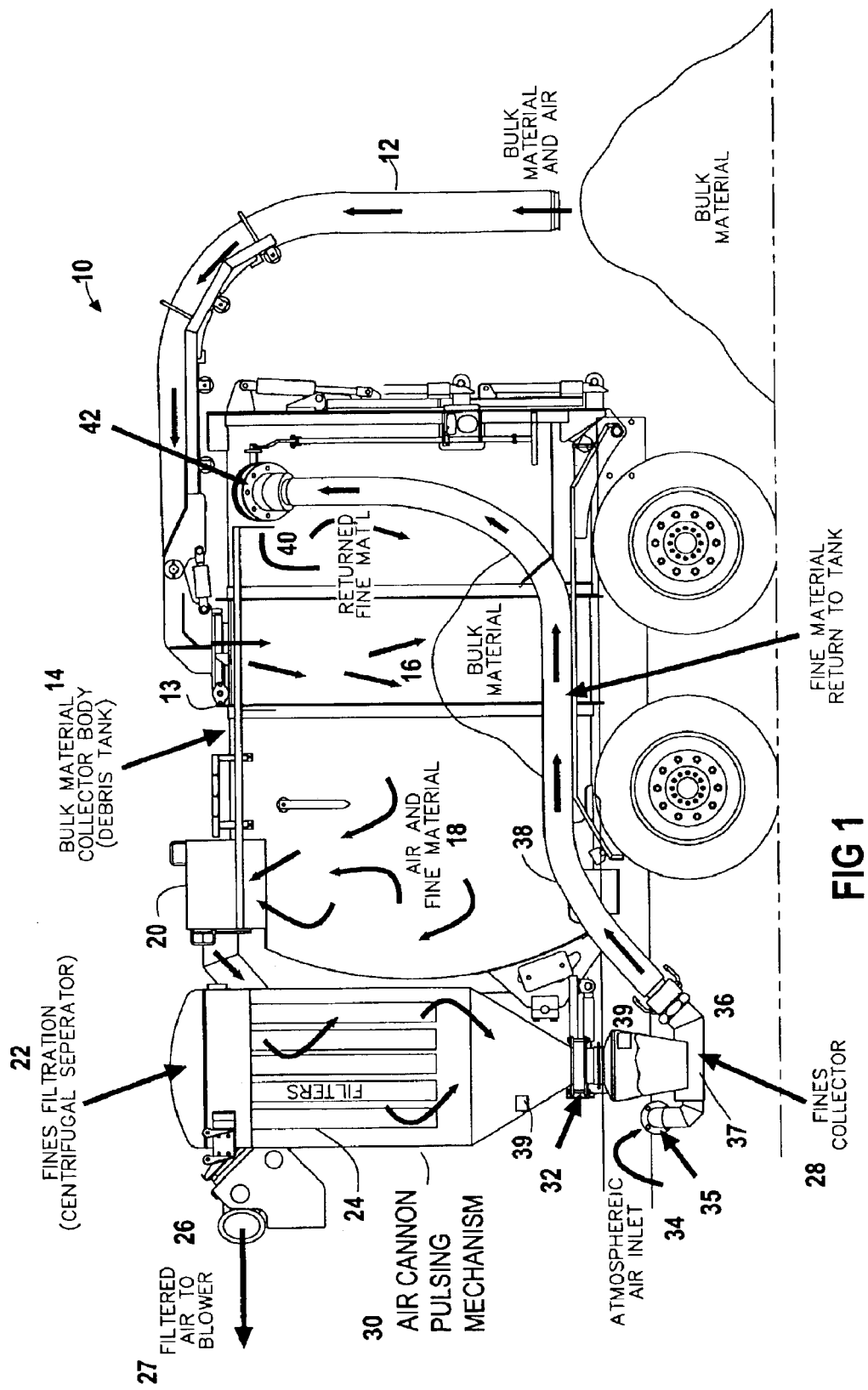
FIG. 1 is a pictorial diagram illustrating the inventive system and method.

According to an embodiment of the invention shown in FIG. 1, a material collection system 10 uses suction to vacuum up bulk material using an intake hose 12. The bulk material enters a debris tank (bulk material collector body) 14 via a bulk material inlet 13. The heavier collected bulk material 16 generally settles in the bottom of the debris tank 14 where, after some amount has collected there, the debris tank 14 is emptied.

Air and fine material 18 exit the debris tank 14 vial a debris tank exit vent 20 and enter a baghouse separator 22 (fines filtration) that filters the fine material from the air. There may be more than one separator 22, and an embodiment of the invention has two side-by-side separators, although more may be used where practical. The baghouse separator 22 may utilize centrifugal mechanisms to perform the separation, but any known mechanism may be used. Filtered air exits the baghouse separator 22 through a baghouse exit vent 26 from which the filtered air 27 is provided to a blower or vacuum source (not shown). The fine material may collect on the filters 24 and, optionally, filter shaker that may be an air cannon or any type of air pulsing mechanism or even a mechanical shaker 30 may be used to dislodge fine material from the filters 24. The air cannon 30 may operate by blasting air into the filters, and the energy from the blast causes the dislodging. This air cannon pulsing may take place prior to the operation of the return of fine material back to the debris tank 14 to help ensure that the filters 24 are clean. The fine material collects in the bottom of the fine material collector 28 where it accumulates up to some predefined amount or for some predetermined period of time.

After some predetermined period of time has elapsed or after some predefined amount of fine material collected, the fine material is sent back into the debris tank 14 as follows. A baghouse valve 32 is closed. This closure prevents two things: first, it prevents additional material from accumulating into the fine material collector 28 from the baghouse separator 22, but second, and more importantly, it prevents any material and air from going from the fine material collector 28 back up into the baghouse separator 22.

Once the baghouse valve 32 is closed, a venturi valve 35 is opened letting air from the atmosphere in past a fine material collector atmospheric air inlet 34. Advantageously, this may be operated while the bulk material is being vacuumed via the hose 12, although it is also possible to seal the debris tank off when the fine material is being collected. This air is drawn into the debris tank 14 by the vacuum created within this tank. The air moves through the air inlet 34 and past a venturi tube 37 that is connected to the air inlet by an airtight conduit, the venturi tube 37 being located directly below the fine material collector 28. The air then moves past a fines collector exhaust vent 36 and through a fines collector material return conduit 38 and into the debris tank 14 via a debris tank fine material inlet 40. Given the long distance that the fine material must travel, most of it settles into the debris tank 14—in general, the air in the debris tank is moving at a relatively slow speed that permits the fine material to settle out.

The fine material is pulled from the fine material collector by the venturi effect. This effect is based on the concept that as the speed of a moving fluid (liquid or gas) increases, the pressure within that fluid decreases. This principle states that the total energy in a steadily flowing fluid system is a constant along a flow path. This implies that an increase in the speed of the fluid must therefore be matched by a decrease in its pressure. As the air streams past an opening in the bottom of the fine material collector 28 in the venturi tube 37, a vacuum is created that pulls the fine material into the venturi tube 37 so that it is carried along by the air into the debris tank 14. This is also assisted by the force of gravity. The inventive use of the venturi system to transfer fine material back to the debris tank 14 permits a simple solution to a problem with material collection systems. When such a system utilizes automated valve operations, the system can result in significant reduced effort for operating such collection systems. When side-by-side baghouse separators 22 are used (not shown), the sequence can be run concurrently for all separators 22, run sequentially, or in any other manner.

As noted above, the sequencing may be triggered by a timer that triggers the sequence to operate on some periodic interval. This periodic interval could be determined based on the type of material being vacuumed, possibly including the material's propensity to produce fine particles, the physical amount of material in a particular area, etc. Alternately, a sensor 39 may be provided that detects an amount of accumulated fine material. The sensor should be located appropriately so that it can detect the accumulated fine material. The sensor could utilize some form of light emitter/detector pair or an acoustic mechanism or some form of proximity detector, pressure sensor, mass/weight measuring device, float, or other known mechanism. A simplified embodiment of the system may not require an automated system, but rather could be operated by a button conveniently located for manual operation.

In an exemplary embodiment, the baghouse valve 32 may be, e.g., approximately 8" in diameter, and the venturi valve may be 3" in diameter. The valves themselves may utilize a butterfly valve or any other type of valve that can produce an airtight seal. The valves can be controlled pneumatically, electrically with solenoids, or via any other type of known control mechanism.

Figure 2:
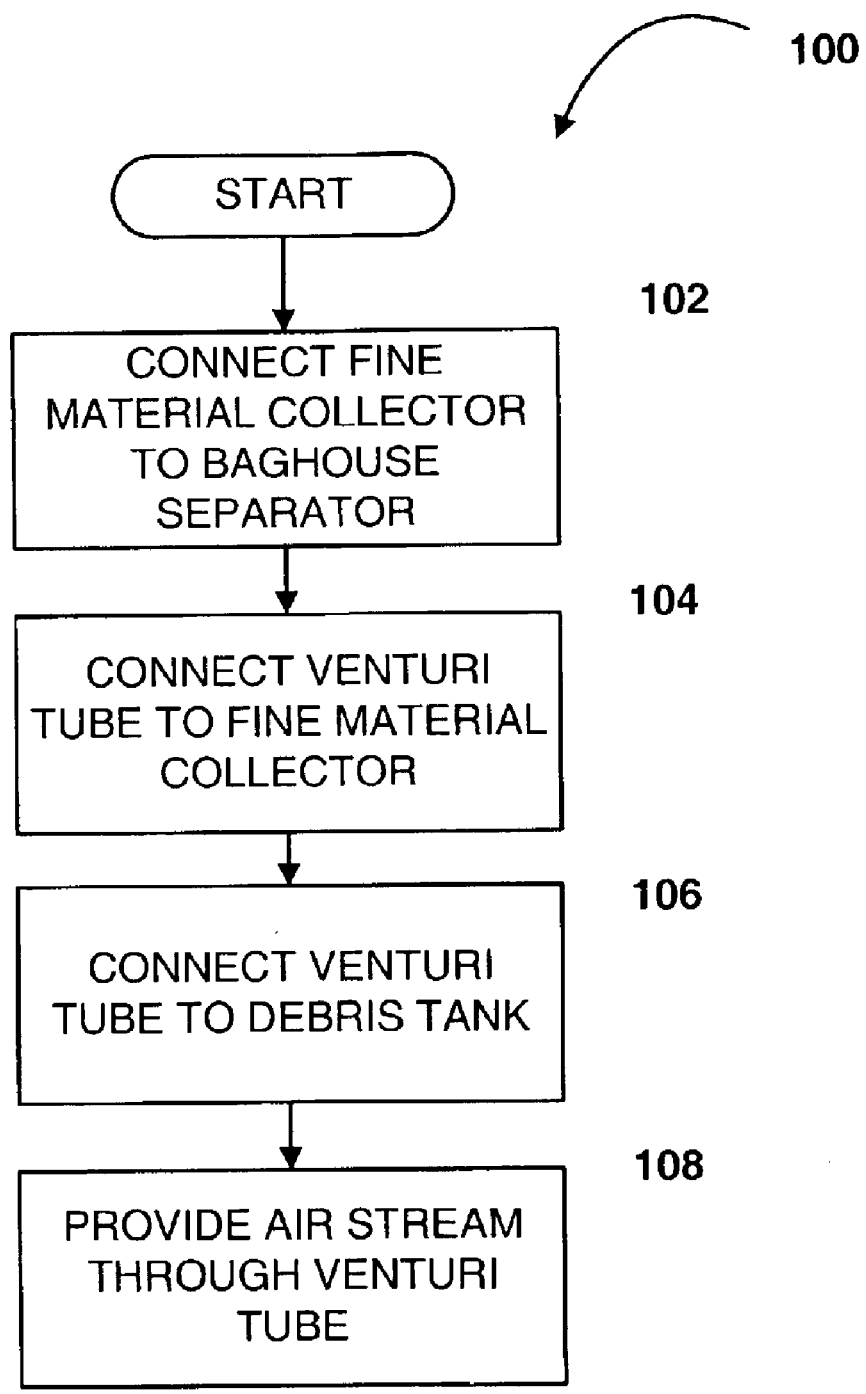
FIG. 2 is a flowchart illustrating the inventive method.

The flowchart in FIG. 2 highlights an embodiment of the inventive method 100 that, in a basic illustration, involves connecting the fine material collector to the baghouse separator 22, 102. The venturi tube 37 is connected to the fine material collector 104 and to the debris tank 14, 106. In operation, and air stream is provided through the venture tube 37, 108 which blows the fine material back into the debris tank 14.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. Furthermore, the present invention could employ any number of conventional techniques for hardware configuration, electronics configuration, control technology, data processing and the like.

The particular implementations shown and described herein are illustrative examples of the invention and are not intended to otherwise limit the scope of the invention in any way. For the sake of brevity, conventional electronics, control systems, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

LIST OF REFERENCE CHARACTERS 10 material collection system
12 intake hose
13 debris tank bulk material inlet
14 debris tank/bulk material collector body
16 collected bulk material
18 fines/fine collected material
20 debris tank exit vent
22 fines filtration/baghouse separator
24 filters
26 baghouse exit vent
27 filtered air to blower
28 fine material collector
30 air cannon pulsing mechanism
32 baghouse valve
34 fine material collector atmospheric air inlet
35 venturi valve
36 fine material collector exhaust vent
37 venturi tube
38 fine collector fine material return conduit
39 sensor
40 debris tank fine material inlet 42 transport safety valve

What is claimed is:

1. An apparatus for vacuuming material for vacuuming material and storing it, comprising:
   a debris tank for collecting vacuumed material;
   a fine material collector configured to collect fine material comprising at least one of fine particles, moisture, and fluid that may be pneumatically separated from the debris tank, but may also communicate with the debris tank; and
   a mechanism configured to return fine material from the fine material collector to the debris tank, wherein the mechanism comprises a gravity-fed venturi tube located below a bottom of the fine material collector connected to the fine material collector in a manner that permits all fine material from the fine material collector to flow through the venturi tube while maintaining a vacuum in the debris tank.

2. The apparatus according to claim 1, further comprising:
   a fine material collector atmospheric air inlet connected to the venturi tube configured to permit atmospheric air to flow through the venturi tube and into the debris tank.

3. The apparatus according to claim 2, further comprising:
   a fine collector fine material return conduit connected to the venturi tube at an end opposite the venturi tube's connection to the fine material collector atmospheric air inlet, the fine material return conduit connected to a debris tank fine material inlet of the debris tank.

4. The apparatus according to claim 1, further comprising:
   a venturi valve located at the fine material collector atmospheric air inlet and configured to either seal or permit passage of atmospheric air into the venturi tube; and
   a baghouse valve configured to pneumatically isolate the fine material collector from the baghouse separator.

5. The apparatus according to claim 4, further comprising:
   a control system connected to the venturi valve and the baghouse valve and configured to operate these valves in a predefined manner.

6. The apparatus according to claim 5, further comprising:
   a control timer configured to operate the control system in a predefined manner according to a time-based criteria.

7. The apparatus according to claim 5, further comprising:
   a sensor configured to detect a predefined volume of fine material and to alert the control system when the predefined volume of fine material has accumulated.

8. The apparatus according to claim 5, further comprising:
   pneumatic or hydraulic components for controlling the system.

9. The apparatus according to claim 1, further comprising:
   a transport safety valve configured to block a return of fine material from the fine material collector to the debris tank.

10. The apparatus according to claim 1, further comprising:
    a filter shaker configured to remove fine material from the filters in the baghouse, the filter shaker selected from the group consisting of:
        an air cannon, an air pulsing mechanism, and a mechanical shaker.

11. The apparatus according to claim 10, wherein the filter shaker is an air cannon pulsing mechanism configured to pulse air into the baghouse separator and remove fine material from filters in the baghouse.

12. The apparatus according to claim 1, wherein the mechanism configured to return the fine material to the debris tank is configured to simultaneously operate with the vacuuming of external material into the debris tank.

13. The apparatus according to claim 1, wherein the debris tank for collecting vacuumed material is located at a rear end of the apparatus.

14. A method for returning fine material from a fine material collector to a debris tank, comprising:
    connecting the fine material collector to a baghouse separator;
    connecting a venturi tube to the fine material collector below a bottom of the fine material collector so that all fine material in the fine material collector can flow via gravity into the venturi tube;
    connecting the venturi tube to a debris tank fine material inlet so that fine material in the venturi tube can flow into the debris tank; and
    providing an air stream through the venturi tube wherein the air stream carries the fine material from the fine material collector to the debris tank using the venturi effect while maintaining a vacuum in the debris tank.

15. The method according to claim 14, further comprising:
    opening a venturi valve to provide the air stream through the venturi tube; and
    closing a baghouse valve prior to providing the air stream through the venturi tube to block air from flowing from the baghouse separator to the fine material collector.

16. The method according to claim 15, wherein operating the venturi valve and the baghouse valve is done in a manual manner.

17. The method according to claim 15, further comprising sequentially executing:
    providing a control system that is connected to and controls the venturi valve and the baghouse valve;
    closing the baghouse valve;
    opening the venturi valve until a termination signal is received;
    closing the venturi valve; and
    opening the baghouse valve.

18. The method according to claim 17, further comprising:
    producing the termination signal in response to the expiration of a timer.

19. The method according to claim 17, further comprising:
    producing the termination signal in response to detecting a particular fine material level in the fine material collector by a sensor.

20. The method according to claim 14, further comprising:
    opening a transport safety valve that, in its closed state, is configured to block a return of fine material from the fine material collector to the debris tank prior to providing the air stream through the venturi tube.

21. The method according to claim 14, further comprising:
    operating an air cannon pulsing mechanism that pulses air into the baghouse separator and removes fine material from filters of the baghouse separator, prior to providing the air stream through the venturi tube.

22. The method according to claim 14, further comprising:
    opening a transport safety valve to permit a return of fine material into the debris tank prior to providing the air stream through the venturi tube.

23. The method according to claim 14, further comprising:
    emptying the debris tank after providing the air stream through the venturi tube.

24. The method according to claim 23, wherein emptying the debris tank comprises:
    removing material in the debris tank out through a rear door by at least one of gravity, auguring, and air pressure in the debris tank.

25. The method according to claim 14, wherein the step of providing an air stream through the venturi tube occurs simultaneously to an operation of vacuuming of external material into the debris tank.

26. The method according to claim 14, wherein the debris tank for collecting vacuumed material is located at a rear end of the apparatus.

* * * * *